US007171357B2

(12) United States Patent
Boland

(10) Patent No.: US 7,171,357 B2
(45) Date of Patent: Jan. 30, 2007

(54) VOICE-ACTIVITY DETECTION USING ENERGY RATIOS AND PERIODICITY

(75) Inventor: Simon Daniel Boland, Pennant Hills (AU)

(73) Assignee: Avaya Technology Corp., Basking Ridge, NJ (US)

( * ) Notice: Subject to any disclaimer, the term of this patent is extended or adjusted under 35 U.S.C. 154(b) by 446 days.

(21) Appl. No.: 09/813,525

(22) Filed: Mar. 21, 2001

(65) Prior Publication Data

US 2002/0165711 A1 Nov. 7, 2002

(51) Int. Cl.
*G10L 15/00* (2006.01)

(52) U.S. Cl. ...................... 704/231; 704/208; 704/214; 704/205

(58) Field of Classification Search ................ 704/223, 704/233, 207–208, 213–215, 231; 310/352
See application file for complete search history.

(56) References Cited

U.S. PATENT DOCUMENTS

| | | | | |
|---|---|---|---|---|
| 4,074,069 | A * | 2/1978 | Tokura et al. | 704/208 |
| 6,275,794 | B1 * | 8/2001 | Benyassine et al. | 704/207 |
| 6,453,291 | B1 * | 9/2002 | Ashley | 704/233 |
| 6,456,964 | B2 * | 9/2002 | Manjunath et al. | 704/205 |
| 6,504,838 | B1 * | 1/2003 | Kwan | 370/352 |
| 6,687,668 | B2 * | 2/2004 | Kim et al. | 704/223 |

OTHER PUBLICATIONS

International Telecommunication Union, G.727, A Silence compression scheme for G.729 optimized for terminals conforming to Recommendation V.70, Annex B (Nov. 1996), pp. Title-16.*

K. El-Maleh et al., "Comparison Of Voice Activity Detection Algorithms For Wireless Personal Communications Systems", *Proc. IEEE Canadian Conference on Electrical and Computer Engineering* (St. John's, Nfld.), May 1997 pp. 470-473.

(Continued)

*Primary Examiner*—Richemond Dorvil
*Assistant Examiner*—Huyen X. Vo
(74) *Attorney, Agent, or Firm*—David Volejnicek

(57) ABSTRACT

A voice activity detector (100) filters (204) out noise energy and then computes a high-frequency (2400 Hz to 4000 Hz) versus low-frequency (100 Hz to 2400 Hz) signal energy ratio (224), total voiceband (100 Hz to 4000 Hz) signal energy (214), and signal periodicity (208) on successive frames of signal samples. Signal periodicity is determined by estimating the pitch period (206) of the signal, determining a gain value of the signal over the pitch period as a function of the estimated pitch period, and estimating a periodicity of the signal over the pitch period as a function of the estimated pitch period and the gain value. Voice is detected (230–232) in a segment if either (a) the difference between the average high-frequency versus low-frequency signal energy ratio and the present segment's high-frequency versus low-frequency energy ratio either exceeds (310) a high threshold value or is exceeded (312) by a low threshold value, or (b) the average periodicity of the signal is lower (306) than a low threshold value, or (c) the difference between the average total signal energy and the present segment's total energy exceeds (304) a threshold value and the average periodicity of the signal is lower (304) than a high threshold value, or (d) the average total signal energy exceeds (412) a minimum average total signal energy by a threshold value and voice has been detected (410) in the preceding segment.

45 Claims, 3 Drawing Sheets

OTHER PUBLICATIONS

D.K. Freeman et al., "The Voice Activity Detector For The Pan-European Digital Cellular Mobile Telephone Service", British Telecom Research Laboratories, 1989 IEEE, CH2673-2/89/0000-0369, pp. 369-372.

K. Srinivasan et al., "Voice Activity Detection For Cellular Networks", Center For Information Processing Research, pp. 85-86.

International Telecommunication Union, G.729, A Silence compression scheme for G.729 optimized for terminals conforming to Recommendation V.70, Annex B (Nov. 1996), pp. Title-16.

Nikos Doukas et al., "Voice Activity Detection Using Source Separation Techniques", Signal Processing Section, Dept. of Electrical Engineering, Imperial College, UK, four (4) pages.

R. Tucker, "Voice activity detection using a periodicity measure" *IEE Proceedings-I,* vol. 139, No. 4, Aug. 1992, pp. 377-380.

M. Rangoussi et al. "Higher Order Statistics Based Gaussianity Test Applied To On-Line Speech Procesing [sic]", 1995 IEEE 1058-6393/95, pp. 303-307.

L.R. Rabiner and R.W. Schafer, "Digital Processing of Speech Signals", pp. 149-150.

R. Steele, "Analysis-By-Synthesis Predictive Coding", pp. 244-253.

L.A. Tucker, et al. "Frequency-Domain Post-Filtering Voice-Activity Detector", U.S. Appl. No. 09/770,922, filed Jan. 26, 2001.

* cited by examiner

VOICE-ACTIVITY DETECTION USING ENERGY RATIOS AND PERIODICITY

TECHNICAL FIELD

This invention relates to signal-classification in general and to voice-activity detection in particular.

BACKGROUND OF THE INVENTION

Voice-activity detection (VAD) is used to detect a voice signal in a signal that has unknown characteristics. Numerous VAD devices are known in the art. They tend to follow a common paradigm comprising a pre-processing stage, a feature-extraction stage, a thresholds comparison stage, and an output-decision stage.

The pre-processing stage places the input audio signal into a form that better facilitates feature extraction. The feature-extraction stage differs widely from algorithm to algorithm, but commonly-used features include (1) energy, either full-band, multi-band, low-pass, or high-pass, (2) zero crossings, (3) the frequency-domain shape of the signal, (4) periodicity measures, and (5) statistics of the speech and background noise. The thresholds comparison stage then uses the selected features and various thresholds of their values to determine if speech is present in or absent from the input audio signal. This usually involves use of some "hold-over" algorithm, or "on"-time minimum threshold, to ensure that detection of either presence or absence of speech lasts for at least a minimum period of time and does not oscillate on-and-off.

Some known VAD methods require a measurement of the background noise a-priori in order to set the thresholds for later comparisons. These algorithms fail when the acoustics environment changes over time. Hence, these algorithms are not particularly robust. Other known VAD methods are automatic and do not require a-priori measurement of background noise. These tend to work better in changing acoustic environments. However, they can fail when background noise has a large energy and/or the characteristics of the noise are similar to those of speech. (For example, the G.729 VAD algorithm incorrectly generates "speech detected" output when the input audio signal is a keyboard sound.) Hence, these algorithms are not particularly robust either.

SUMMARY OF THE INVENTION

This invention is directed to solving these and other problems and disadvantages of the prior art. Generally, according to the invention, voice activity detection uses a ratio of high-frequency signal energy and low-frequency signal energy to detect voice. The advantage of using this measure is that it can distinguish between speech and keyboard sounds better than simply using high-frequency energy or low-frequency energy alone. Preferably, voice activity detection further uses a periodicity measure of the signal. While a periodicity measure has been used in speech codecs for pitch-period estimation and voiced/unvoiced classification, it is used here to distinguish between speech and background noise. Also preferably, voice activity detection further uses total signal energy to detect voice. Significantly, however, no initial decision about detection is based on the total energy level alone. This makes the detection less susceptible to non-speech changes in the acoustic environment, for example, to volume changes or to loud non-speech sounds such as keyboard sounds. Furthermore, this makes it possible to use the detection for very low-energy speech, which in turn makes the detection more robust in situations where a poor-quality microphone is used or where the microphone recording-level is low.

Specifically according to the invention, voice activity detection involves determining a difference between (a) an average ratio of energy above a first threshold frequency in a signal—illustratively the signal energy between about 2400 Hz and about 4000 Hz—and (b) energy below the first threshold frequency in the signal—illustratively the signal energy between about 100 Hz and 2400 Hz—and (b) a present ratio of the energy above the first threshold frequency in the signal and energy below the first threshold frequency in the signal, and indicating that the signal includes a voice signal if the difference is either exceeded by a first threshold value or exceeds a second threshold value that is greater than the first threshold value. Preferably, the noise energy—illustratively, energy in the signal below about 100 Hz—is removed from the signal prior to the determining, so as to eliminate effects of noise energy on voice activity detection.

Preferably, the voice activity detection further involves determining the average periodicity of the signal, and indicating that the signal includes a voice signal if the average periodicity is lower than a third threshold value. Illustratively, determining the average periodicity involves estimating a pitch period of the signal, determining a gain value of the signal over the pitch period as a function of the estimated pitch period, and estimating a periodicity of the signal over the pitch period as a function of the estimated pitch period and the gain value.

Further preferably, the voice activity detection further involves determining a difference between an average total energy in the signal—illustratively the total energy in the voiceband from about 100 Hz to about 4000 Hz—and present total energy is the signal, and indicating that the signal includes a voice signal if the difference between the average total energy and the present total energy exceeds a fourth threshold value and the average periodicity of the signal is lower than a fifth threshold value.

Further preferably, the voice activity detection is performed on successive segments of the signal—illustratively on each 80 samples of the signal taken at a rate of 8 KHz. If there is not an indication that voice has been detected in the present segment but there is an indication that voice has been detected in the preceding segment, a determination is made of whether the average total energy of the signal exceeds a minimum average total energy of the signal by a sixth threshold value. If so, an indication is made that a voice signal has been detected in the present segment of the signal.

While the invention has been characterized in terms of method steps, it also encompasses apparatus that performs the method steps. The apparatus preferably includes an effecter—any entity that effects the corresponding step, unlike a means—for each step. The invention further encompasses any computer-readable medium containing instructions which, when executed in a computer, cause the computer to perform the method steps.

These and other features and advantages of the present invention will become more apparent from the following description of an illustrative embodiment of the invention considered together with the drawing.

DETAILED DESCRIPTION

Figure 1:
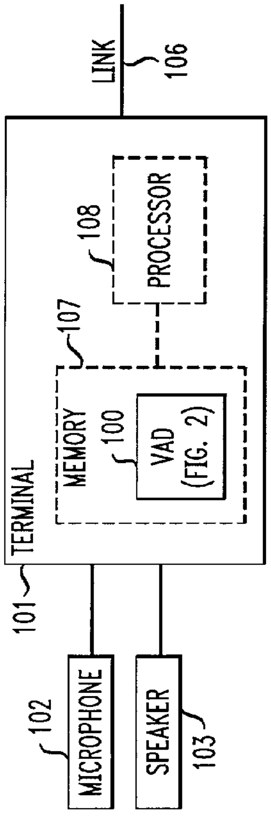
FIG. 1 is a block diagram of a communications apparatus that includes an illustrative implementation of the invention.

FIG. 1 shows a communications apparatus. It comprises a user terminal 101 that is connected to a communications link 106. Terminal 101 and link 106 may be either wired or wireless. Illustratively, terminal 101 is a voice-enabled personal computer and VoIP link 106 is a local area network (LAN). Terminal 101 is equipped with a microphone 102 and speaker 103. Devices 102 and 103 can take many forms, such as a telephone handset, a telephone headset, and/or a speakerphone. Terminal 101 receives an analog input signal from microphone 102, samples, digitizes, and packetizes it, and transmits the packets on LAN 106. This process is reversed for input from LAN 106 to speaker 103. Terminal 101 is equipped with a voice-activity detector (VAD) 100. VAD 100 is used to detect voice signal received from microphone 102 in order to, for example, implement silence suppression and to determine half-duplex transitions.

Figure 2:
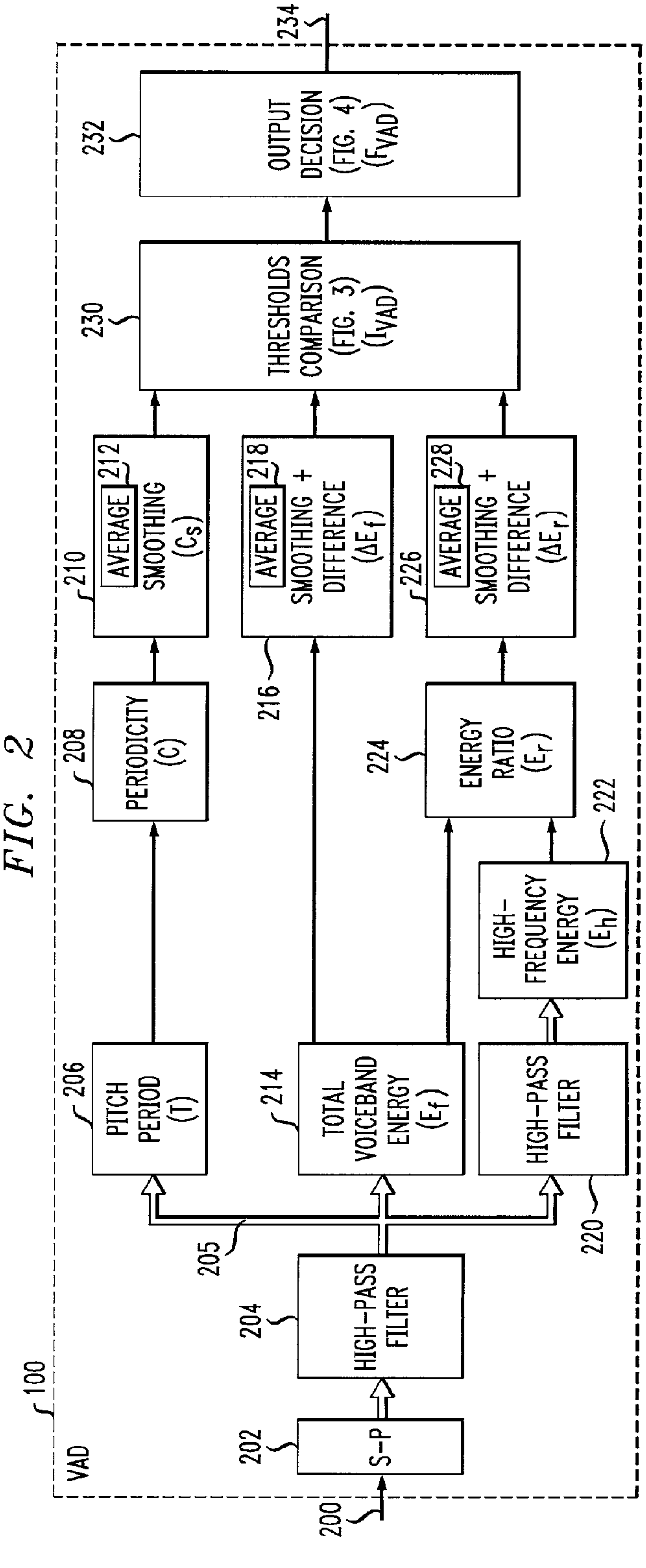
FIG. 2 is a block diagram of a voice-activity detector (VAD) of the apparatus of FIG. 1.

According to the invention, an illustrative embodiment of VAD 100 takes the form shown in FIG. 2. VAD 100 may be implemented in dedicated hardware such as an integrated circuit, in general-purpose hardware such as a digital-signal processor, or in software stored in a memory 107 of terminal 101 or some other computer-readable medium and executed on a processor 108 of terminal 101. Illustratively, the analog output of microphone 102 is sampled at a rate of 8K samples/sec. and digitized by terminal 101. VAD 100 receives a stream 200 of the digitized signal samples and performs serial-to-parallel (S-P) conversion 202 thereon by buffering the samples into frames of N samples, where N is illustratively 80. The frames are then passed through a high-pass filter 204 to remove therefrom noise caused by the equipment-in-use or the background environment. Filter 204 is illustratively a $10^{th}$ order infinite impulse response (IIR) filter with a cut-off frequency around 100 $H_z$. The filtered frames are then distributed to components of a feature-extraction stage for computation of the following parameters: periodicity, total voiceband energy, and a high-low frequency energy ratio.

Periodicity

The periodicity calculation involves first estimating a pitch period (T) 206 of the speech signal. Pitch-period estimation is known in speech processing. The illustrative method used here may be found in L. R. Rabiner and R. W. Schafer, *Digital Processing of Speech Signals*, Prentice Hall, Englewood Cliffs, N.J. (1978), pp. 149–150. The value of pitch period T that minimizes the average magnitude difference function below is calculated as:

$$S(T) = \frac{1}{T}\sum_{n=0}^{T} |x[n] - x[n-T]|$$

where x[n] n=0, 1 . . . N−1 is the input signal to pitch period 206 calculation. This is computed for $T=T_{min}$, $T_{min}+1$, . . . , $T_{max}$. The constants $T_{min}$ and $T_{max}$ are the lower and upper limits of the pitch period, respectively. The values chosen here are 19 and 80. The value that minimizes the above function is represented as $T_{opt}$. After finding $T_{opt}$, a periodicity (C) 208 is illustratively computed in a similar way to computation of the pitch prediction filter parameters used in speech codecs and detailed in R. A. Salami et al., "Speech Coding", *Mobile Radio Communications,* R. Steele (ed.), Pentech Press, London (1992) pp. 245–253. A gain value (A) is computed as:

$$A = \frac{\sum_{n=0}^{T_{opt}-1} x[n]x[n-T_{opt}]}{\sum_{n=0}^{T_{opt}-1} [x[n-T_{opt}]]^2}$$

The periodicity C is then given by:

$$C = \frac{\sum_{n=0}^{T_{opt}} [x[n] - Ax[n-T_{opt}]]^2}{\sum_{n=0}^{T_{opt}+} [x[n-T_{opt}]]^2}$$

When the signal is fully periodic, C is 0. Conversely, when the signal is random, C is 1.

Total Voiceband Energy

The total voiceband energy ($E_f$) 214 is computed for the voiceband frequency range from 100 $H_z$ to 4000 $H_z$. The total voiceband energy in decibels is given by:

$$E_f = 10\log_{10}\left[\frac{1}{N}\sum_{n=0}^{N-1} x[n]^2\right]$$

where x[n] n=0, 1, . . . , N−1 is the input signal to total voiceband energy 214 calculation.

High-low Frequency Energy Ratio

Energy ratio ($E_r$) 224 is computed as the ratio of energy above 2400 $H_z$ to the energy below 2400 $H_z$ in the input voiceband signal. To obtain the high-frequency signal, the output of high-pass filter 204 is passed through a second high-pass filter 220 that has a cut-off frequency of 2400 $H_z$. The energy in decibels of the high-frequency signal is given by:

$$E_h = 10\log_{10}\left[\frac{1}{N}\sum_{n=0}^{N-1} x_h[n]^2\right]$$

where $x_h[n]$ is the signal output by high-pass filter 220. The high-low energy ratio ($E_r$) 224 is then given by:

$$E_r = \frac{E_h}{E_f - E_h}$$

where $E_f$ is the total voiceband energy 214.

To make the algorithm operate automatically, initial values of the parameters $E_f$, $E_r$, and C are computed for the first $N_i$ frames that enter VAD 100 following initialization. Here $N_i$ has been chosen as 32. During this stage of computation, the minimum value of $E_f$ is computed and is denoted as $E_{min}$. For every subsequent frame, running averages 212, 218, 228 are used together with smoothing of the parameters to make the algorithm less sensitive to local fluctuations. For the total voiceband energy and the energy ratio, differences 216 and 226, respectively, between the smoothed frame values and the running averages are computed. These are denoted by $\Delta E_f$ and $\Delta E_r$. The minimum energy value $E_{min}$ is also updated, illustratively every 20 frames.

Figure 3:
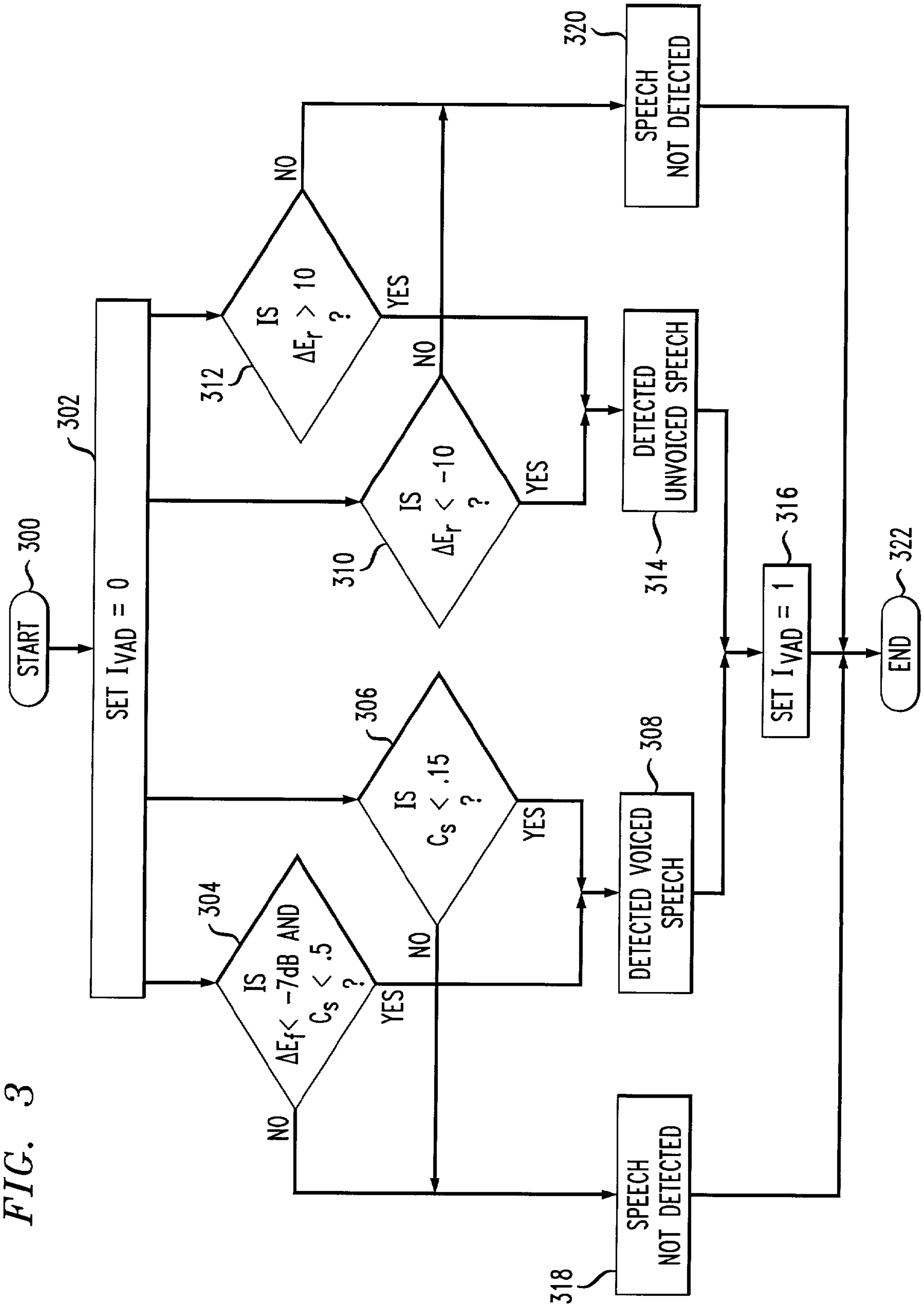
FIG. 3 is a functional block diagram of a thresholds comparison block of the VAD of FIG. 2.

After feature extraction, a comparison of the parameters is made with several thresholds to generate an initial VAD ($I_{VAD}$), at thresholds comparison block 230. The procedure for this is illustrated in the flowchart of FIG. 3. Essentially, four different comparisons are made based on the smoothed periodicity $C_s$, energy difference $\Delta E_f$, and energy-ratio difference $\Delta E_r$. Comparisons 304 and 306 are for detecting voiced/periodic portions of speech. Comparisons 310 and 312 are for detecting unvoiced/random portions of speech.

Threshold comparison 230 is performed anew for every frame processed by VAD 100. Upon startup of thresholds comparison 230, at step 300 of FIG. 3, the value of $I_{VAD}$ is initialized to zero, at step 302. A set of four comparisons is then made at steps 304, 306, 310, and 312. A comparison is made at step 304 to determine if $\Delta E_f < -7$ dB and $C_s < 0.5$; if so, voiced speech has been detected, as indicated at step 308; if not, speech has not been detected, as indicated at step 318. A comparison is made at step 306 to determine if $C_s < 0.15$; if so, voiced speech has been detected, as indicated at step 308; if not, speech has not been detected, as indicated at step 318. A comparison is made at step 310 to determine if $\Delta E_r < -10$; if so, unvoiced speech has been detected, is indicated at step 314; if not, speech has not been detected, as indicated at step 320. A comparison is made at step 312 to determine if $\Delta E_r > 10$; if so, unvoiced speech has been detected, as indicated at step 314; if not, speech has not been detected, as indicated at step 320. If speech has been detected by any one or more of the comparisons 304, 306, 310, and 312, the value of $I_{VAD}$ is set to one, at step 316; if speech has not been detected by any of the comparisons, the value of $I_{VAD}$ remains zero. Thresholds comparison block 230 then ends, at step 322.

Figure 4:
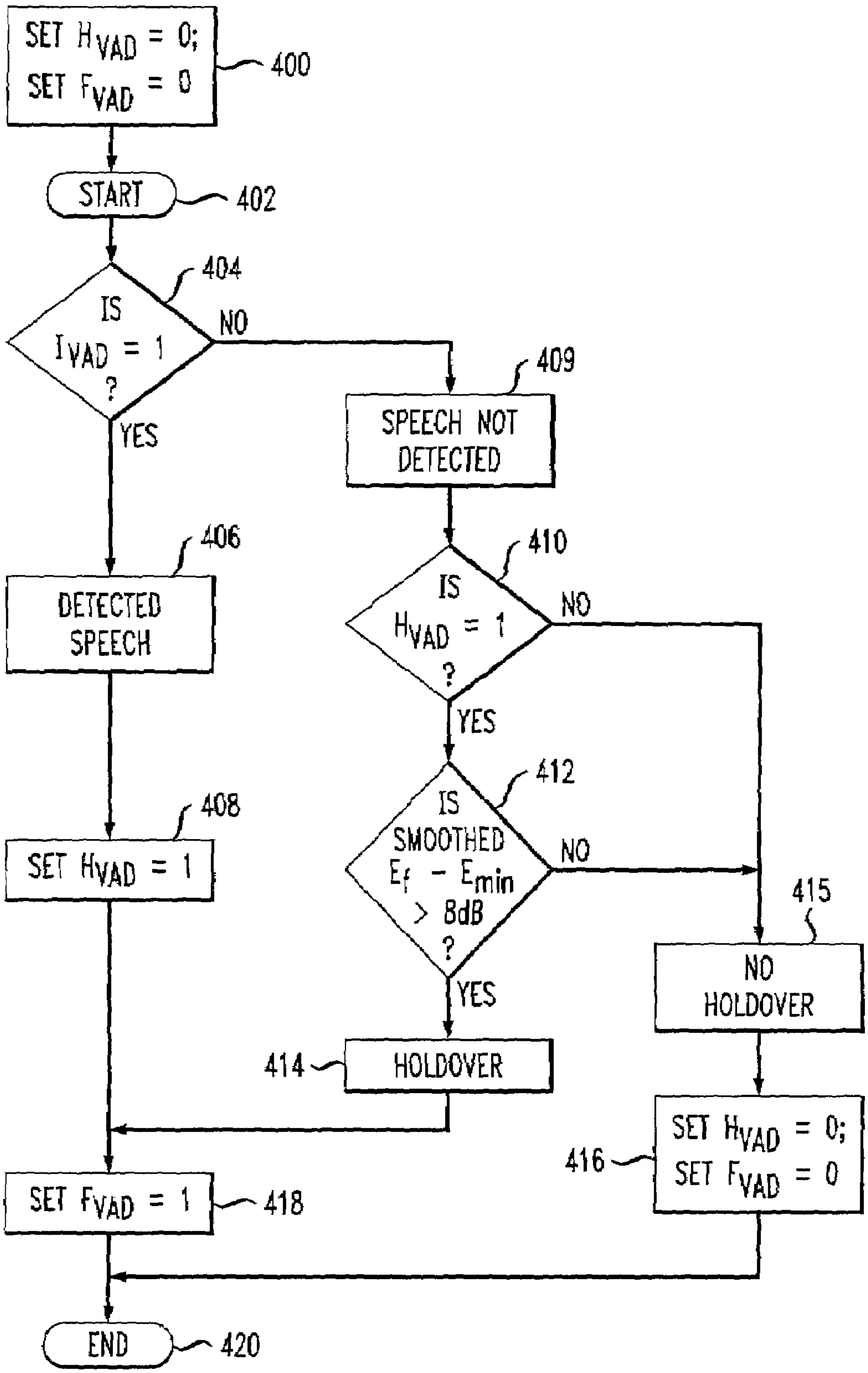
FIG. 4 is a functional block diagram of an output decision block of the VAD of FIG. 2.

After thresholds comparison 230 has been made to determine the value of $I_{VAD}$, a final output decision is made at block 232. A flowchart describing this block is shown in FIG. 4. Output decision 232 is performed anew for every value of $I_{VAD}$ produced by threshold comparison 230.

Upon startup of VAD 100, the values of a holdover flag $H_{VAD}$ and a final VAD flag $F_{VAD}$ are initialized to zero, at step 400. Upon receipt of an $I_{VAD}$ value from block 230, at step 402, output decision 232 checks whether the received value of $I_{VAD}$ is one, at step 404. If so, it means that speech has been detected, as indicated at step 406. Output decision 232 therefore sets $H_{VAD}$ to one, at step 408, and sets $F_{VAD}$ to one, at step 418. The value of $F_{VAD}$ constitutes output 234 of VAD 100. If the value of $I_{VAD}$ is found to be zero at step 404, speech has not been detected, as indicated at step 409. However, output decision 232 checks if the value of $H_{VAD}$ is set to one from a previous frame, at step 410. If so, output decision 232 further checks if the smoothed value of $E_f$ less the value of $E_{min}$ is greater than 8 dB, at step 412. If so, holdover is indicated, at step 414, and so output decision 232 maintains $F_{VAD}$ set to one, at step 418, even though speech has not been detected. If the value of $H_{VAD}$ is found to be zero at step 410, or if the difference between the smoothed energy and the minimum energy computed at step 412 has fallen to less than 8 dB, speech is not detected and there is no hold-over, as indicated at step 415. Output decision 232 therefore sets the values of $H_{VAD}$ and $F_{VAD}$ to zero, at step 416. Following step 416 or 418, output decision 232 ends its operation, at step 420, until the next $I_{VAD}$ value is received at step 402.

Of course, various changes and modifications to the illustrative embodiment described above will be apparent to those skilled in the art. For example, the noise-energy filter may be dispensed with. A different value may be used for the high/low frequency threshold. Sampling of the input signal may be affected at a different rate, especially at higher rates. The uppermost frequency of the voice band is subsequently increased. The holdover may be dispensed with and the initial VAD output $I_{VAD}$ may be used as the final VAD output. A different procedure may be used to estimate the pitch period or, the combined threshold comparison of the energy and periodicity may be replaced with a single energy threshold comparison. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method of voice activity detection comprising:

receiving a communications signal comprising multiple frequencies;

processing the signals to determine a difference between (a) an average ratio of energy above a first threshold frequency in the signal and energy below the first threshold frequency in the signal and (b) a present ratio of energy above the first threshold frequency in the signal and energy below the first threshold frequency in the signal; and in response to the difference being exceeded by a first threshold value, indicating that the signal includes a voice signal; and in response to the difference exceeding a second threshold value greater than the first threshold value, indicating that the signal includes a voice signal.

2. The method of claim 1 wherein:

the first threshold frequency is about 2400 Hz.

3. The method of claim 1 further comprising:

prior to the determining, removing noise energy from the signal.

4. The method of claim 3 wherein:

removing comprises filtering out from the signal frequencies below a second threshold frequency lower than the first threshold frequency.

5. The method of claim 4 wherein:

the second threshold frequency is about 100 Hz.

6. The method of claim 1 further comprising:

repeating the steps for successive segments of the signal.

7. The method of claim 1 further comprising:

determining an average periodicity of the signal; and in response to the average periodicity of the signal being lower than a third threshold value, indicating that the signal includes a voice signal.

8. The method of claim 7 wherein:

determining an average periodicity comprises estimating a pitch period of the signal;

determining a gain value of the signal over the pitch period as a function of the estimated pitch period;

determining a periodicity of the signal over the pitch period as a function of the estimated pitch period and the gain value; and averaging the determined periodicity with previously-determined at least one said determined periodicity.

9. The method of claim 7 further comprising:

repeating the steps for successive segments of the signal.

10. The method of claim 7 further comprising:

determining a difference between average total energy in the signal and present total energy in the signal; and in response to the difference between the average total energy and the present total energy being lower than a fourth threshold value and the average periodicity of the signal being lower than a fifth threshold value, indicating that the signal includes a voice signal.

11. The method of claim 10 further comprising:

prior to determining the difference between the average total energy and the present total energy, removing noise energy from the signal.

12. The method of claim 10 further comprising:

repeating the steps for successive segments of the signal.

13. The method of claim 12 further comprising:

in response to not indicating for a present segment of the signal that the signal includes a voice signal, and indicating for a segment of the signal preceding the present segment that the signal includes a voice signal, determining if the average total energy of the signal exceeds a minimum average total energy of the signal by a sixth threshold value; and in response to the average total energy exceeding the minimum average total energy by the sixth threshold value, indicating that the signal includes a voice signal.

14. The method of claim 1 wherein:

determining a difference between the average total energy and the present total energy comprises determining a difference between average total energy in a voiceband of the signal and present total energy in the voiceband.

15. The method of claim 14 wherein:

the voiceband extends from about 100 Hz to about 4000 Hz.

16. An apparatus for detecting voice activity comprising:

means for determining an average ratio of energy above a first threshold frequency in a signal comprising multiple frequencies and energy below the first threshold frequency in the signal;

means for determining a present ratio of energy above the first threshold frequency in the signal and energy below the first threshold frequency in the signal;

means for determining a difference between the average ratio and the present ratio; and means cooperative with the means for determining a difference and responsive to the difference being exceeded by a first threshold value, for indicating that the signal includes a voice signal, and further responsive to the difference exceeding a second threshold value greater than the first threshold value, for indicating that the signal includes a voice signal.

17. The apparatus of claim 16 further comprising:

means for determining an average periodicity of the signal; and means cooperative with the means for determining an average periodicity and responsive to the average periodicity being lower than a third threshold value, for indicating that the signal includes a voice signal.

18. The apparatus of claim 17 further comprising:

means for determining a difference between average total energy in the signal and present total energy in the signal; and means cooperative with the means for determining a difference between the average total energy and the present total energy and the means for determining an average periodicity and responsive to the difference between the average total energy and the present total energy being lower than a fourth threshold value and the average periodicity of the signal being lower than the fifth threshold value, for indicating that the signal includes a voice signal.

19. The apparatus of claim 18 for detecting voice activity in successive segments of the signal, further comprising:

means responsive to a lack of indication for a present segment of the signal that the signal includes a voice signal and to an indication for a segment of the signal preceding the present segment that the signal includes a voice signal, for determining if the average total energy of the signal exceeds a minimum average total energy of the signal by a sixth threshold value; and means cooperative with the means for determining of the average total energy exceeds the minimum average total energy and responsive to the average total energy exceeding the minimum average total energy by the sixth threshold value, for indicating that the signal includes a voice signal.

20. The apparatus of claim 18 further comprising:

means for removing noise energy from the signal prior to determining the difference between the average total energy and the present total energy.

21. The apparatus of claim 18 wherein:

each of the means perform their function for each successive segment of the signal.

22. The apparatus of claim 17 wherein:

the means for determining an average periodicity comprise means for estimating a pitch period of the signal;

means for determining a gain value of the signal over the pitch period as a function of the estimated pitch period;

means for determining a periodicity of the signal over the pitch period as a function of the estimated pitch period and the gain value; and means for averaging the determined periodicity with previously-determined at least one said determined periodicity.

23. The apparatus of claim 22 wherein:

each of the means perform their function for each successive segment of the signal.

24. The apparatus of claim 16 wherein:

the first threshold frequency is about 2400 Hz.

25. The apparatus of claim 16 further comprising:

means for removing noise energy from the signal prior to the determining of the average ratio and the present ratio.

26. The apparatus of claim 25 wherein:

the means for removing comprise means for filtering out from the signal frequencies below a second threshold frequency lower than the first threshold frequency.

27. The apparatus of claim 26 wherein:

the second threshold frequency is about 100 Hz.

28. The apparatus of claim 16 wherein:

each of the means perform their function for each successive segment of the signal.

29. The apparatus of claim 16 wherein:

the means for determining a difference between the average total energy and the present total energy comprise means for determining a difference between average total energy in a voiceband of the signal and present total energy in the voiceband.

30. The apparatus of claim 29 wherein:

the voiceband extends from about 100 Hz to about 400 Hz.

31. A computer-readable medium containing executable instructions which, when executed in a computer, cause the computer to perform the steps of:

determining a difference between (a) an average ratio of energy above a first threshold frequency in a signal comprising multiple frequencies and energy below the first threshold frequency in the signal and (b) a present ratio of energy above the first threshold frequency in the signal and energy below the first threshold frequency in the signal; and in response to the difference being exceeded by a first threshold value, indicating that the signal includes a voice signal; and in response to the difference exceeding a second threshold value greater than the first threshold value, indicating that the signal includes a voice signal.

32. The medium of claim 31 wherein:

the first threshold frequency is about 2400 Hz.

33. The medium of claim 31 further comprising instructions for causing the computer to perform the step of:

prior to the determining, removing noise energy from the signal.

34. The medium of claim 33 wherein the instructions for removing comprise instructions for causing the computer to perform the step of:

filtering out from the signal frequencies below a second threshold frequency lower than the first threshold frequency.

35. The medium of claim 34 wherein:

the second threshold frequency is about 100 Hz.

36. The medium of claim 31 further comprising instructions for causing the computer to repeat the steps for successive segments of the signal.

37. The medium of claim 31 further comprising instructions for causing the computer to perform the steps of:

determining an average periodicity of the signal; and in response to the average periodicity of the signal being lower than a third threshold value, indicating that the signal includes a voice signal.

38. The medium of claim 37 wherein the instructions for determining an average periodicity comprise instructions for causing the computer to perform the steps of:

estimating a pitch period of the signal;

determining a gain value of the signal over the pitch period as a function of the estimated pitch period;

determining a periodicity of the signal over the pitch period as a function of the estimated pitch period and the gain value; and averaging the determined periodicity with previously-determined at least one said determined periodicity.

39. The medium of claim 38 further comprising instructions for causing the computer to repeat the steps for successive segments of the signal.

40. The medium of claim 37 further comprising instructions for causing the computer to perform the steps of:

determining a difference between average total energy in the signal and present total energy in the signal; and in response to the difference between the average total energy and the present total energy being lower than a fourth threshold value and the average periodicity of the signal being lower than a fifth threshold value, indicating that the signal includes a voice signal.

41. The medium of claim 40 further comprising instructions for causing the computer to perform the step of:

prior to determining the difference between the average total energy and the present total energy, removing noise energy from the signal.

42. The medium of claim 40 further comprising instructions for causing the computer to repeat the steps for successive segments of the signal.

43. The medium of claim 42 further comprising instructions for causing the computer to perform the steps of:

in response to not indicating for a present segment of the signal that the signal includes a voice signal, and indicating for a segment of the signal preceding the present segment that the signal includes a voice signal, determining if the average total energy of the signal exceeds a minimum average total energy of the signal by a sixth threshold value; and in response to the average total energy exceeding the minimum average total energy by the sixth threshold value, indicating that the signal includes a voice signal.

44. The medium of claim 31 wherein the instructions for determining a difference between the average total energy and the present total energy comprise instructions for causing the computer to perform the step of:

determining a difference between average total energy in a voiceband of the signal and present total energy in the voiceband.

45. The medium of claim 44 wherein:

the voiceband extends from about 100 Hz to about 4000 Hz.

* * * * *